(12) United States Patent
Zhao et al.

(10) Patent No.: US 10,649,618 B2
(45) Date of Patent: May 12, 2020

(54) SYSTEM AND METHOD FOR CREATING VISUAL REPRESENTATION OF DATA BASED ON GENERATED GLYPHS

(71) Applicant: FUJI XEROX CO., LTD., Minato-ku, Tokyo (JP)

(72) Inventors: Jian Zhao, Cupertino, CA (US); Yin-Ying Chen, Sunnyvale, CA (US); Francine Chen, Menlo Park, CA (US)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 15/980,526

(22) Filed: May 15, 2018

(65) Prior Publication Data

US 2019/0354261 A1    Nov. 21, 2019

(51) Int. Cl.
| | |
|---|---|
| *G06T 11/20* | (2006.01) |
| *G06F 3/0481* | (2013.01) |
| *G06T 11/60* | (2006.01) |
| *G06N 3/08* | (2006.01) |
| *G06K 9/62* | (2006.01) |
| G06F 3/0482 | (2013.01) |

(52) U.S. Cl.
CPC ....... *G06F 3/04817* (2013.01); *G06K 9/6215* (2013.01); *G06N 3/08* (2013.01); *G06T 11/206* (2013.01); *G06T 11/60* (2013.01); *G06F 3/0482* (2013.01)

(58) Field of Classification Search
None
See application file for complete search history.

(56) References Cited

PUBLICATIONS

Ha et al., "A Neural Representation of Sketch Drawings", May 2017. (Year: 2017).*
Radford, A., et al., "Unsupervised Representation Learning With Deep Convolutional General Adversarial Networks", Nov. 19, 2015, pp. 1-15.
Ha, D., et al., "A Neural Representation of Sketch Drawings", Apr. 16, 2017, pp. 1-20.
Haroz, S., et al, "ISOTYPE Visualization-Working Memory, Performance, and Engagement with Pictographs", In Proceeding of the 33rd Annual ACM Conference on Human Factors in Computing Systems, CHI'15, Seoul, Republic of Korea, Apr. 18-23, 2015 (10 pages).
Kim, N.W., et al., Data-Driven Guides: Supporting Expressive Design for Information Graphics. IEEE Transactions on Visualization and Computer Graphics Forum, 2017 (10 pages).
Satyanarayan A., et al., "Lyra: An Interactive Visualization Design Environment". Computer Graphics Form, vol. 33 (2014), No. 3 (10 pages).

(Continued)

*Primary Examiner* — Nicholas R Wilson
(74) *Attorney, Agent, or Firm* — Procopio, Cory, Hargreaves & Savitch LLP

(57) ABSTRACT

A method and system for creating a visual representation of data is provided. The method may include receiving a user input to be represented by a glyph, generating, by a neural network, the glyph based on a vector extracted based on the received user input, linking an aspect of the generated glyph with an attribute of the data to be visually represented; and displaying the visual representation of the data created using the generated glyph to represent that linked aspect of the data.

21 Claims, 7 Drawing Sheets
(2 of 7 Drawing Sheet(s) Filed in Color)

(56) References Cited

PUBLICATIONS

Setlur, V., et al., "Automatic Generation of Semantic Icon Encodings for Visualizations". Session: Designing and Understanding Visualizations, CHI' 2014, One of a CHInd, Apr. 26-May 1, 2014, Toronto, ON, Canada, pp. 541-550.
Goodfellow, I.J., et al., "Generative Adversarial Nets", (NIPS 2014), pp. 1-9.

* cited by examiner

SYSTEM AND METHOD FOR CREATING VISUAL REPRESENTATION OF DATA BASED ON GENERATED GLYPHS

BACKGROUND

Field

The present disclosure relates to data representation using generated, unique glyphs or icons, and more specifically, to systems and methods for automatically creating visual representation of data based using glyphs or icon generated by a machine based on an initial user input.

Related Art

Glyphs or Icons are increasingly being used to represent data or ideas in digital displays of data. For example, glyphs or icons may be used in infographic charts commonly used to visually and expressively convey messages in data. The glyphs or icons in an infographic may be an integral component of infographics that are often required to both carry concise information and provide a compelling design, which can lead to a higher level of professionalism. Glyphs or icons are also commonly used in messaging or communications platforms to express messages or concepts. For example, emoji glyphs or icons are regularly used to express feelings or ideas simply with a minimal number of words or no words at all.

In order to accurately capture varying ideas or concept, these glyphs or icons may require quite a bit of editing effort. To reduce editing work, related art authoring tools have been developed to help designers create modify glyphs or icons for inclusion in infographics or messaging application. However, many of the related art tools request that users draft glyphs from scratch, which may be beyond an amateur user's capability. Other related art tools simply provide for searching for a relevant glyph in an existing database, which may be perceived as stale or create issues of potential copyright violation. Example implementations of the present application may address these deficiencies.

SUMMARY OF THE DISCLOSURE

Aspects of the present application may relate to a method for creating a visual representation of data. The method may include receiving a user input to be represented by a glyph, generating, by a neural network, the glyph based on a vector extracted based on the received user input, linking an aspect of the generated glyph with an attribute of the data to be visually represented; and displaying the visual representation of the data created using the generated glyph to represent that linked aspect of the data.

Additional aspects of the present application may relate to a non-transitory computer readable medium having stored therein a program for making a computer execute a method for creating a visual representation of data. The method may include receiving a user input to be represented by a glyph, generating, by a neural network, the glyph based on a vector extracted based on the received user input, linking an aspect of the generated glyph with an attribute of the data to be visually represented; and displaying the visual representation of the data created using the generated glyph to represent that linked aspect of the data.

Further aspects of the present application relate to a method generating a glyph. The method may include providing a user interface on a display, the user interface being configured to receive a user input to be represented by a glyph, the user input comprising one or more of a word, a short description, a user generated sketch, and a user generated stroke, generating, by a neural network, a potential glyph based on a vector extracted based on the received user input, displaying the generated potential glyph for selection.

Still further aspects of the present application relate to a computer apparatus configured to create a visual representation of data. The computer apparatus may include means for receiving a user input to be represented by a glyph, means for generating, by a neural network, the glyph based on a vector extracted based on the received user input, means for linking an aspect of the generated glyph with an attribute of the data to be visually represented; and means for displaying the visual representation of the data created using the generated glyph to represent that linked aspect of the data.

Still further aspects of the present application relate to a computer apparatus configured to generate a glyph. The computer apparatus may include means for providing a user interface on a display, the user interface being configured to receive a user input to be represented by a glyph, the user input comprising one or more of a word, a short description, a user generated sketch, and a user generated stroke, means for generating, by a neural network, a potential glyph based on a vector extracted based on the received user input, means for displaying the generated potential glyph for selection.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
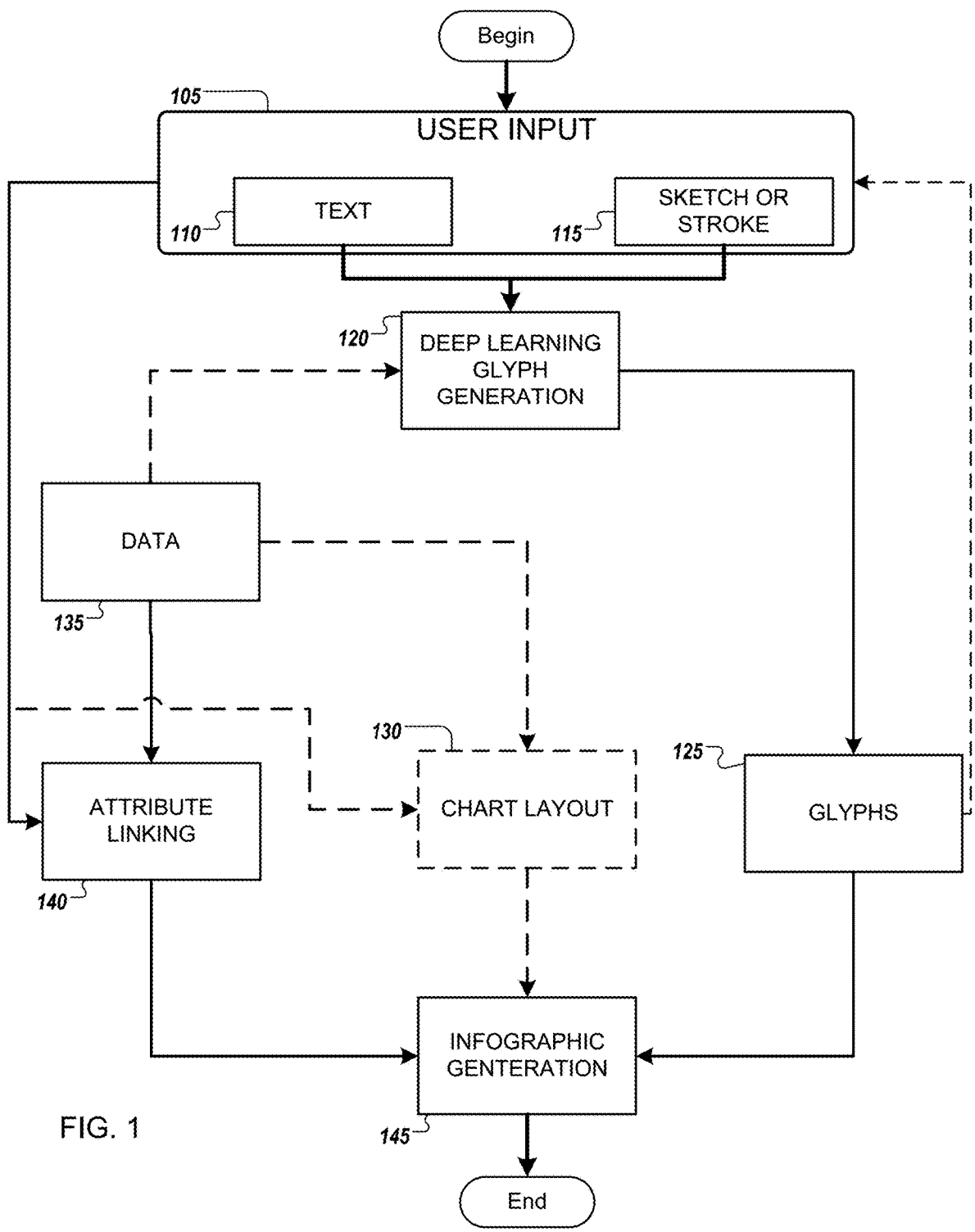
FIG. 1 illustrates a flow chart of a process for generating glyphs or icons for an infographic in accordance with an example implementation of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application.

As discussed above, obtaining glyphs (icons) for annotation of infographics or use in messaging platforms may be cumbersome. For example, users may not be capable of creating them, and glyphs identified through search may lead to issues of copyright and difficulties in identifying a set in the same style. Example implementations of the present application may include systems and methods to support a user in interactively creating, modifying, and guiding glyph authoring using neural networks. The system may include an image glyph generator to provide non-copyrighted glyph variations and an interface to support glyph creation as discussed in greater detail below.

To serve a wider range of users, the example implementations may leverage a glyph image generator to illustrate a variety of candidate glyph images for a user to initialize and edit to create a desired glyph. Compared to searching for a relevant glyph in an existing database, a generated glyph can be unique, new and avoid issues of copyright. Further, in some example implementations the generated glyph may be compared to known, copyrighted icons or glyphs and when a detected similarity exceeds a threshold, the generated glyph may be rejected and the generation model updated to create greater dissimilarity in subsequently generated glyphs.

Moreover, it may provide a higher level of customization because user feedback can be integrated in an interactive process by automatically regenerating glyph images based on a user's image and text edits. It may be noteworthy that generated glyphs created by the system may exhibit considerable variation, which may be useful references for brainstorming creative designs for use in infographics.

Further, while related art systems may be capable of learning a sequence of strokes to also generate sketches like human drawings, Deep Convolution Generative Adversarial Network (DCGANs) generators in accordance with example implementations do not require being trained with stroke or drawing sequence training information.

In the present application, the terms "image", and "drawings" may be used interchangeably to describe one or more of a photo, a video, a three-dimensional or 360° image recording, a drawing, painting, a sketch, a computer-generated image, or any other visual representation that may be produced, captured or may otherwise represent an item, event or occurrence in the real world. The "image" and "drawings" may be stored as a data file or other data structure on a computer readable medium including but not limited to a magnetic storage device, an optical storage device, a solid state storage device, an organic storage device or any other storage device that may be apparent to a person of ordinary skill in the art.

Similarly, the terms "glyph", "icon", or "drawing" may be used interchangeably to describe any graphic conceptual representation of a word, phrase, object, place, person, or thing that may be apparent to a person of ordinary skill in the art. Further, the "glyph", "icon", or "drawing" may be stored as a data file or other data structure on a computer readable medium including but not limited to a magnetic storage device, an optical storage device, a solid state storage device, an organic storage device or any other storage device that may be apparent to a person of ordinary skill in the art. Further, the computer readable medium may include a local storage device, a cloud-based storage device, a remotely located server, or any other storage device that may be apparent to a person of ordinary skill in the art.

FIG. 1 illustrates a flow chart of a process 100 for generating glyphs or icons for an infographic in accordance with an example implementation of the present application. The process 100 may be performed by a computing device in a computing environment such as example computing device 705 of the example computing environment 700 illustrated in FIG. 7 discussed below. Though the elements of process 100 may be illustrated in a particular sequence, example implementations are not limited to the particular sequence illustrated. Example implementations may include actions being ordered into a different sequence as may be apparent to a person of ordinary skill in the art or actions may be performed in parallel or dynamically, without departing from the scope of the present application.

As illustrated in FIG. 1, user input to be represented by a generated glyph is received by the system at 105. In some example implementations, the user input may include input a short text description 110, such as "apple", or draw a sketch or a few strokes 115, or both. The user input may be provided by a user using a user interface (UI) such as UI 300 illustrated in FIG. 3 discussed below. At 120, the system may take the user input (e.g., short text description 110 and sketch or a few strokes 115) to generate a range of glyphs 125 using deep learning or machine processes, based on the text description 110 and/or the sketch/strokes 115 provide. In some example implementations, these glyphs 125 may optionally be further edited by a user and the system may repeat 105 and 120 to generate new sets of glyphs accordingly.

Further, in some example implementations, the data 135 to be represented may optionally be used to affect the glyph generation at 120. For example, certain attributes of the data 135, such as the variance or variability, may affect the number of different types of glyphs generated or the degree of variation between different glyphs generated. Additional aspects of the glyph generation are discussed in greater detail below with respect to sub-process 400 of FIG. 4 below.

In parallel with the glyph generation 120, the user input 105 may be used to link the drawing properties of the glyphs to attributes of the data 135 at 140 to adjust the appearances of the glyphs for each set of entry in the dataset 135. For example, A UI, such as UI 300 of FIG. 3 may be used to specify attributes of the data (e.g., value, range, category, etc.) and drawing properties (e.g., stroke/line color, fill opacity, glyph type, fill color, fill pattern, stroke/line width, stroke/line pattern, etc.) to be linked in the completed infographic.

Further in parallel with the glyph generation 120 and attribute linking 140, the user input 105 and the data 135 may optionally be used to specify chart layout parameters at 130 to be used to generate the infographic. For example, A UI, such as UI 300 of FIG. 3 may be used to select different chart layouts that visualize a row dataset, and further attach the generated glyphs to the basic chart layout.

The glyphs 125 produced by the glyph generation 120, the attribute linking 140 and, optionally, the chart layout parameters 130 may be used at 145 to generate an infographic. Afterwards, a user can add annotations and perform post-editing on the chart, thus producing a final compelling infographic that is empowered by the generated glyphs. The produced infographic may be displayed, stored, printed, posted to social media or otherwise used in any manner that may be apparent to a person of ordinary skill in the art. The process 100 may end after the infographic is generated at 145.

Figure 2:
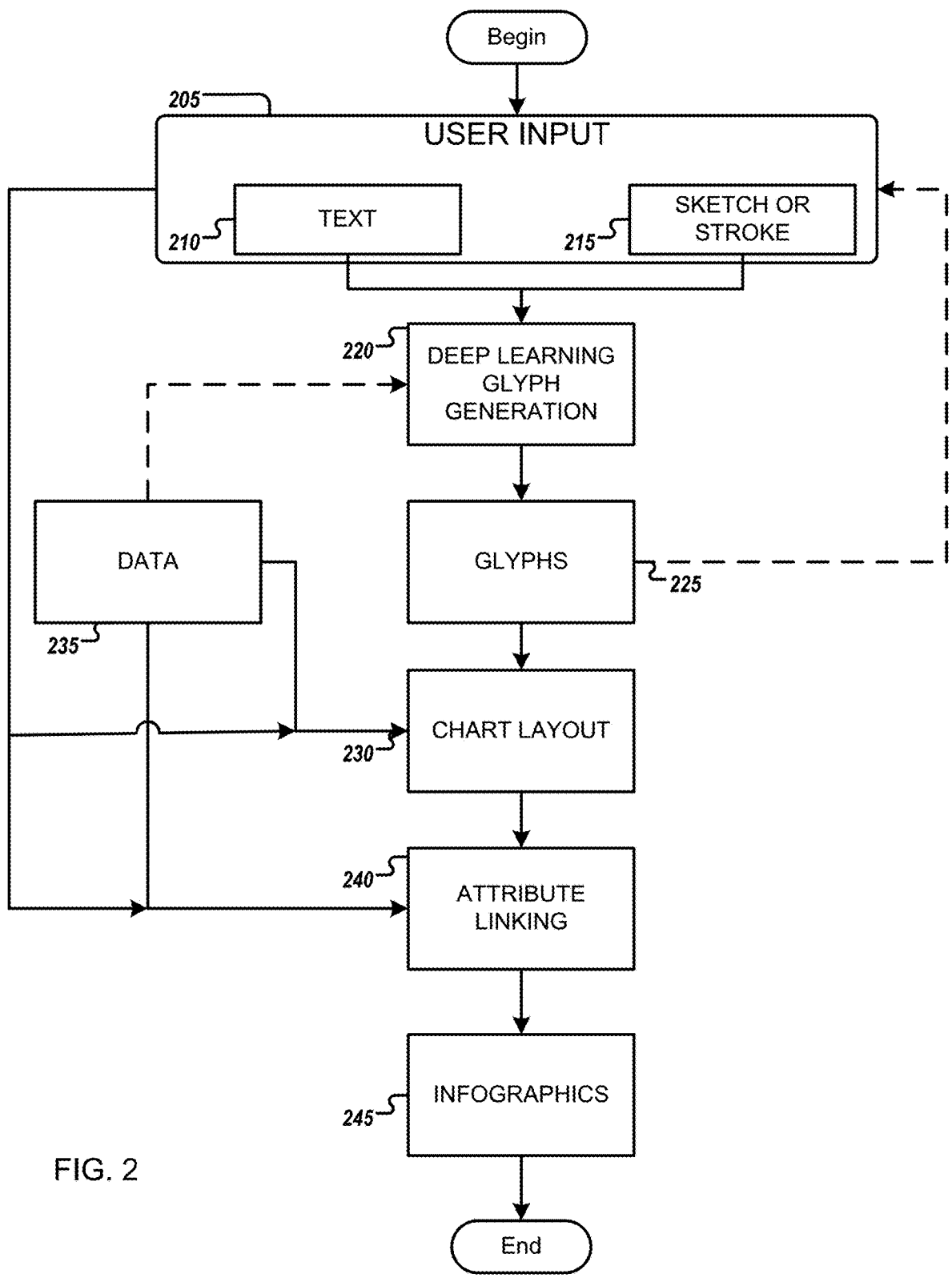
FIG. 2 illustrates a flow chart of another process for generating glyphs or icons for an infographic in accordance with an example implementation of the present application.

FIG. 2 illustrates a flow chart of another process 200 for generating glyphs or icons for an infographic in accordance with an example implementation of the present application. Some aspects of the process 200 may be similar to the process 100 discussed above with respect to FIG. 1 as such redundant discussion may be omitted herein. The process 200 may be performed by a computing device in a computing environment such as example computing device 705 of the example computing environment 700 illustrated in FIG. 7 discussed below. Though the elements of process 200 may be illustrated in a particular sequence, example implementations are not limited to the particular sequence illustrated. Example implementations may include actions being ordered into a different sequence as may be apparent to a person of ordinary skill in the art or actions may be performed in parallel or dynamically, without departing from the scope of the present application.

As illustrated in FIG. 2, user input to be represented by a generated glyph is received by the system at 205. In some example implementations, the user input may include input a short text description 210, such as "apple", or draw a sketch or a few strokes 215, or both. The user input may be provided by a user using a user interface (UI) such as UI 300 illustrated in FIG. 3 discussed below. At 220, the system may take the user input (e.g., short text description 110 and sketch or a few strokes 115) to generate a range of glyphs 225 using deep learning or machine processes, based on the text description 210 and/or the sketch/strokes 215 provide. In some example implementations, these glyphs 125 may optionally be further edited by a user and the system may repeat 105 and 120 to generate new sets of glyphs accordingly.

Further, in some example implementations, the data 235 to be represented may optionally be used to affect the glyph generation at 220. For example, certain attributes of the data 235, such as the variance or variability, may affect the number of different types of glyphs generated or the degree of variation between different glyphs generated. Additional aspects of the glyph generation are discussed in greater detail below with respect to sub-process 400 of FIG. 4 below.

After the glyph generation 220, the produced glyphs 225, in combination with the user input 205 and the data 235 may be used to specify chart layout parameters at 230 to be used to generate the infographic. For example, A UI, such as UI 300 of FIG. 3 may be used to select different chart layouts that visualize a row dataset, and further attach the generated glyphs to the basic chart layout.

Further, after chart layout parameters are specified at 230, the user input 205 may be used to link the drawing properties of the generated glyphs 225 to attributes of the data 235 at 240 to adjust the appearances of the glyphs for each set or entry in the dataset 235. For example, A UI, such as UI 300 of FIG. 3 may be used to specify attributes of the data (e.g., value, range, category, etc.) and drawing properties (e.g., stroke/line color, fill opacity, glyph type, fill color, fill pattern, stroke/line width, stroke/line pattern, etc.) to be linked in the completed infographic.

After the attribute linking 240, the glyphs 225, the linked attributes and the chart layout parameters may be used at 245 to generate an infographic. Afterwards, a user can add annotations and perform post-editing on the chart, thus producing a final compelling infographic that is empowered by the generated glyphs. The produced infographic may be displayed, stored, printed, posted to social media or otherwise used in any manner that may be apparent to a person of ordinary skill in the art. The process 200 may end after the infographic is generated at 245.

Figure 3:
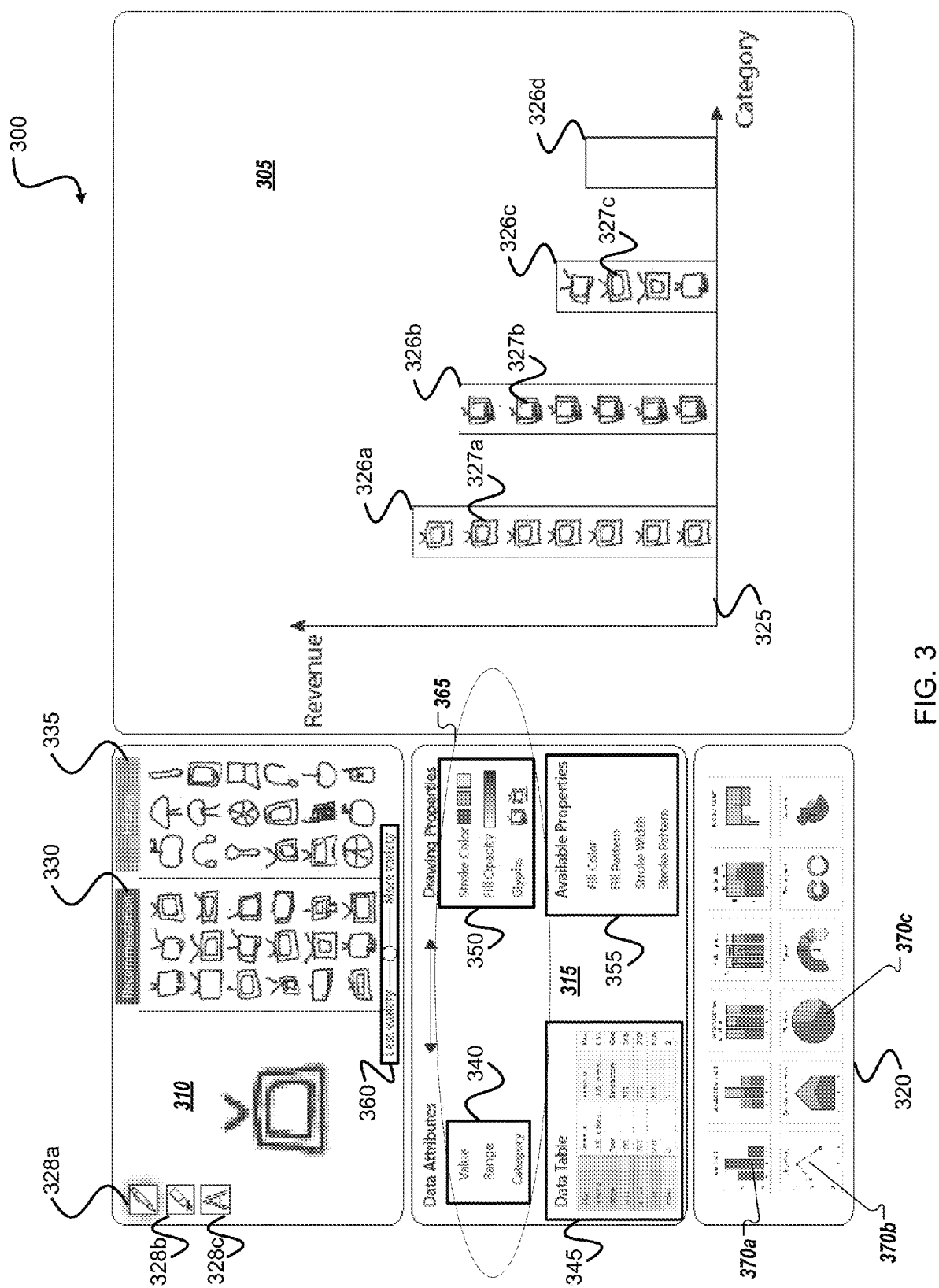
FIG. 3 illustrates a user interface (UI) that may be used to control the system in accordance with an example implementation of the present application.

FIG. 3 illustrates a user interface (UI) 300 that may be used to control the system in accordance with an example implementation of the present application. The UI 300 may be displayed on a display device including, but not limited to, a computer monitor, TV, touchscreen display of a mobile device, a laptop display screen, or any other display device that may be apparent to a person of ordinary skill in the art. As illustrated, UI 300 includes contains four main panels, including a main canvas 305, a glyph authoring panel 310, a data binding panel 315, and a chart layout panel 320.

On the glyph authoring panel 310, a user can either input text (e.g., "TV") describing an object or draw a quick sketch of that object, using the three buttons 328a-328c on the left of the panel. In some example implementations, the glyph authoring panel 310 may be implemented as a touch screen display to allow a user to drawing directly into the glyph authoring panel 310, or may be configured to receive input from a user input device such as an electronic sketch panel or other device to allow a user's strokes to be captured and recognized. The system may generate a list of glyphs with variations based on the user's input, which is shown in the recommendation section 330 of the glyph authoring panel 310.

A user can select glyphs from that recommendation section 330 to apply, and, in some example implementations, add or remove strokes to refine the sketch using buttons 328a and 328b. Based on the new input, the system may generate a new list of glyphs and update the recommendation section 330. This may form an iterative and interactive process of authoring glyphs. In some example implementations, the UI 300 may also include a slider 360 to allow a user to adjust the level of variety of glyphs to generate more or less consistent glyphs. For example, a user may want to generate a plurality of similar glyphs to represent data having only slight differences, or a user may want to generate a plurality of widely varying glyphs to represent widely varying data.

Further, in some example implementations, the UI 300 may also include browsing history of generated glyphs displayed in the history section 335 on the right of the panel, which allows a user to go back and choose previously created glyphs. This may serves as a customized and dynamic glyph library for the user.

The glyph authoring panel 310 may facilitate or assist users with glyph curation and authoring, especially for general audiences who do not have good artistic skills. For example, if a user is really not good at drawing, they can just input a word (e.g., "TV" in FIG. 3); and if a user wants to take some control but is not very confident, they can draw some initial strokes. In both cases, the system offers a wide selection of glyphs to lower the barriers of making professional-like drawings. Also, at any time, a user may be able to edit the generated results if they are not satisfied. In some example implementations, the glyph authoring panel 310 may be provided as a separate UI and may be independent from an infographic generation UI, such as the UI 300 illustrated in FIG. 3. For example, the glyph authoring panel 310 may be implemented as part of messaging or communication platform or any other platform requiring authoring or creation of custom glyphs or icons.

Returning to the UI 300, the data binding panel 325 may allow a user to choose which drawing properties 350 (e.g., fill color, stroke width, etc.) should be encoded or linked to which data attributes 340 from a raw dataset that is loaded at the beginning. For example, a user may wish to set the fill color of a glyph to indicate different Revenue ranges. The connected drawing properties and data attributes are displayed on the top part (emphasized by oval 365) of the data binding panel 325. A small data table 345 may provide a preview of the dataset and its attributes. The data binding panel 325 also shows a list of available drawing properties 355 (e.g., the drawing properties not yet bound with data attributes). The data binding panel 325 may allow a user to create the data bindings with simple drag-and-drop interaction (e.g., dragging an attribute label in the data table to an available drawing property or vice versa).

With the chart layout panel 320, a user can easily pick one common chart type to present their data, such as a line chart 370b, a bar chart 370a, a pie chart 370c, or any other chart type that may be apparent to a person of ordinary skill in the art. The chart layout panel 320 may display a basic chart that is driven by the data on the main canvas 305, just like a spreadsheet application or program. A user then can attach the glyphs to the chart elements to increase the expressiveness and attractiveness of the graphics. For example, in FIG. 3, a user may selects the bar chart layout 370a and attaches three different types of "TV" glyphs 327a, 327b, 372c to different bars 326a, 326b, 326c in the chart 325 in the main canvas. One empty bar 326d that is originally generated by the bar chart layout is left to add another "TV" glyph.

Additionally, basic editing functions of a common drawing tool may also be incorporated in some example implementations. Thus, a user may make text annotations on the chart, add a chart title, adjust size, and perform other chart editing operations.

Figure 4:
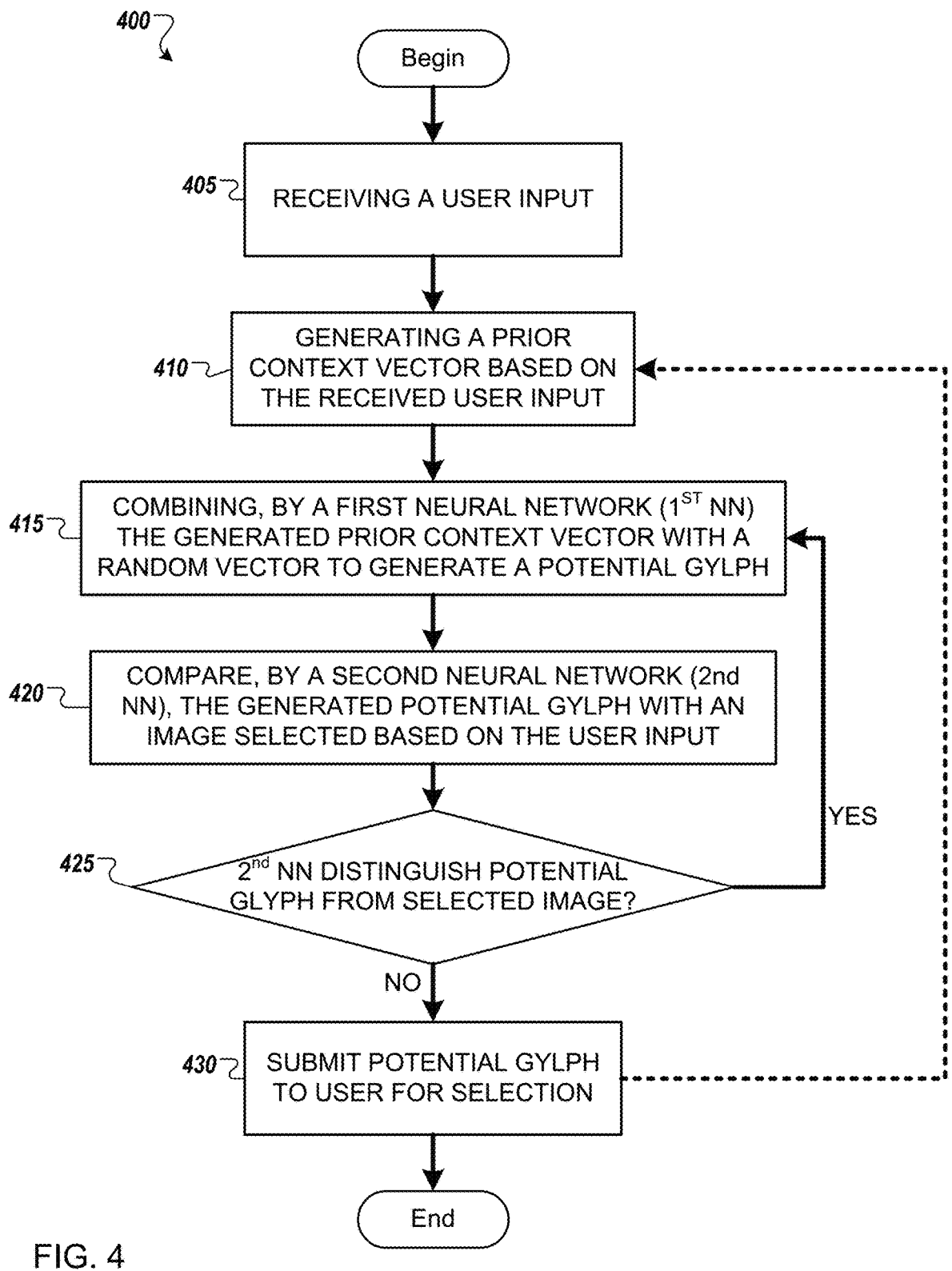
FIG. 4 illustrates a flow chart of a process for generating glyphs or icons in accordance with an example implementation of the present application.

FIG. 4 illustrates a flow chart of a process 400 for generating glyphs or icons in accordance with an example implementation of the present application. The process 400 may be performed as part of generating an infographic using a process such as process 100 or process 200 illustrated in FIGS. 1 and 2 discussed above. The process 400 may also be performed independently of an infographic generating process. For example, the process 400 may be performed as part of a spreadsheet or data manipulation program, a presentation development program, a messaging or communications platform or as part of a social media product or any other application that might be apparent to a person of ordinary skill in the art.

The process 400 may be performed by a computing device in a computing environment such as example computing device 705 of the example computing environment 700 illustrated in FIG. 7 discussed below. Though the elements of process 400 may be illustrated in a particular sequence, example implementations are not limited to the particular sequence illustrated. Example implementations may include actions being ordered into a different sequence as may be apparent to a person of ordinary skill in the art or actions may be performed in parallel or dynamically, without departing from the scope of the present application.

Figure 5:
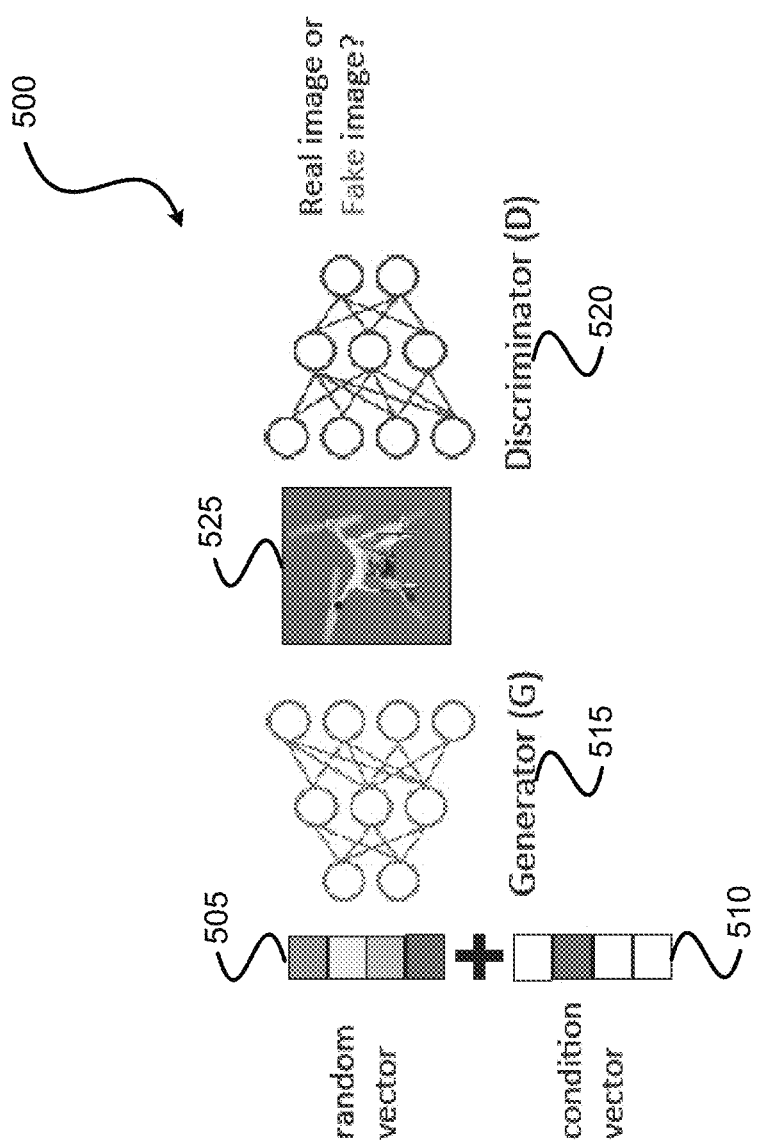
FIG. 5 illustrates a schematic representation of the glyph generation process illustrated in FIG. 4 in accordance with example implementations of the present application.

In some example implementations, the process 400 may involve the use of a Generative Adversarial Networks (GANs), such as GANS 515 and 520 illustrated in FIG. 5. For explanatory purposes, the description of the process 400 may reference elements of the schematic representation 500 of FIG. 5 discussed in greater detail below.

In the process 400, a user input is received at 405 defining an aspect on which the glyph or icon is to be based. The step 405 may be analogous to the steps 105 and 205 discussed above with respect to processes 100 and 200 discussed above. In some example implementations, the user input may be a word or short textual description (e.g., "apple"), a simple sketch, or a few simple strokes provided through a UI.

After the user input is received, a prior context vector (e.g., condition vector 510 illustrated in FIG. 5 discussed below) may be generated based on the received user input at 410. In some example implementations, the prior context vector may be generated or extracted from one or more known graphical representations associated with the received word or textual description. In other example implementations, the prior context vector may be generated or extracted from the simple sketch or strokes provided by the user input.

Once the prior context vector has been generated, the prior context vector may be combined with randomly generated vector (e.g., random vector 505 illustrated in FIG. 5 discussed below) by a first neural network ($1^{st}$ NN) at 415. In some example implementations, the first neural network may be considered a generator neural network (e.g., generator NN 515 of FIG. 5) that has been trained with pre-existing glyphs to generate potential glyphs that are attempted to be indistinguishable from the pre-existing glyphs (e.g., potential glyphs having a high similarity to the pre-existing glyphs). In some example implementations, a variability slider (e.g., slider 360 of UI 300) may control the weighting factors applied to the randomly generated vector and the prior context vector during the combining to control variability between the potential glyph generated and the prior context vector. By weighting the random vector more strongly, more variable potential glyphs may be produced.

After the potential glyphs are generated by the first neural network, the potential glyph is provided to a second neural network ($2^{nd}$ NN) tasked with comparing the potential glyph with one or more preexisting images, drawings, glyphs, or icons selected based on the received user input at 420. In some example implementations, the second neural network may be trained with pairs of glyphs or icons and other images or drawings that have been tagged as either similar or not similar. At 425, a determination is made whether the second neural network could distinguish the potential glyph from the one or more preexisting images, drawings, glyphs, or icons. If the second neural network can distinguish the potential glyph from the one or more preexisting images, drawings, glyphs or icons (Yes at 425), the process 400 may return to 415 and the first neural network may repeat step 415 to generate a new potential glyph.

Conversely, if the second neural network cannot distinguish the potential glyph from the one or more preexisting images, drawings, glyphs or icons (No at 425), the process 400 may continue to step 430 and the potential glyph to a user for selection. Once the potential glyph is submitted to the user, the process 400 may end in some example implementations. In other example implementations, the process 400 may return to 410 to generate a new prior context vector based on the received user input and the process 400 may be repeated to generate additional potential glyphs.

Further, in some example implementations the generated glyph may be compared, by the discriminator neural network 520 ($2^{nd}$ NN) or by another neural network, to known copyrighted icons or glyphs and when a detected similarity exceeds a threshold, the generated glyph may be rejected and the generator model updated to create greater dissimilarity in subsequently generated glyphs. The threshold may be defined by a user, a manager, a service provider, or may be dynamically determined by the system.

FIG. 5 illustrates a schematic representation 500 of the glyph generation process described above with respect to FIG. 4 in accordance with example implementations of the present application. As discussed above, the glyph generation process may use two or more Generative adversarial networks (GANs) 515, 520. These GANs are illustrated in FIG. 5 are a class of machine learning methods that are implemented by the two neural networks, one as a generator 515 and the other as a discriminator 520, competing with each other in a zero-sum game framework. The generator network 515 may be trained to generate realistic glyphs or icons 525 that the discriminator network 520 could not differentiate pre-existing images, drawings, or glyphs. Conversely, the discriminator network 520 may be trained to differentiate between fake glyphs generated by the generator network and pre-existing images, drawings, or glyphs in training data.

To generate glyphs with complicated texture, the network architecture of the networks 515, 520 may be extended to multiple layers and replaced with strided convolutions, namely, Deep Convolution Generative Adversarial Networks (DCGANs). As discussed above, GANs can be initiated by combining a random vector 505 to keep the uniqueness of the generated glyphs and prior context condition vector 510 (e.g., text or visual information) to force the generated glyphs to be aligned with the specified context.

Example implementations of the present application are not limited to the GANs 515, 520 illustrated in FIG. 5 or the process 400 illustrated in FIG. 4 and other neural networking architectures and processes for generating a glyph or icon based on a received user input that may be apparent to a person of ordinary skill in the art may be used in example implementations of the present application.

Figure 6:
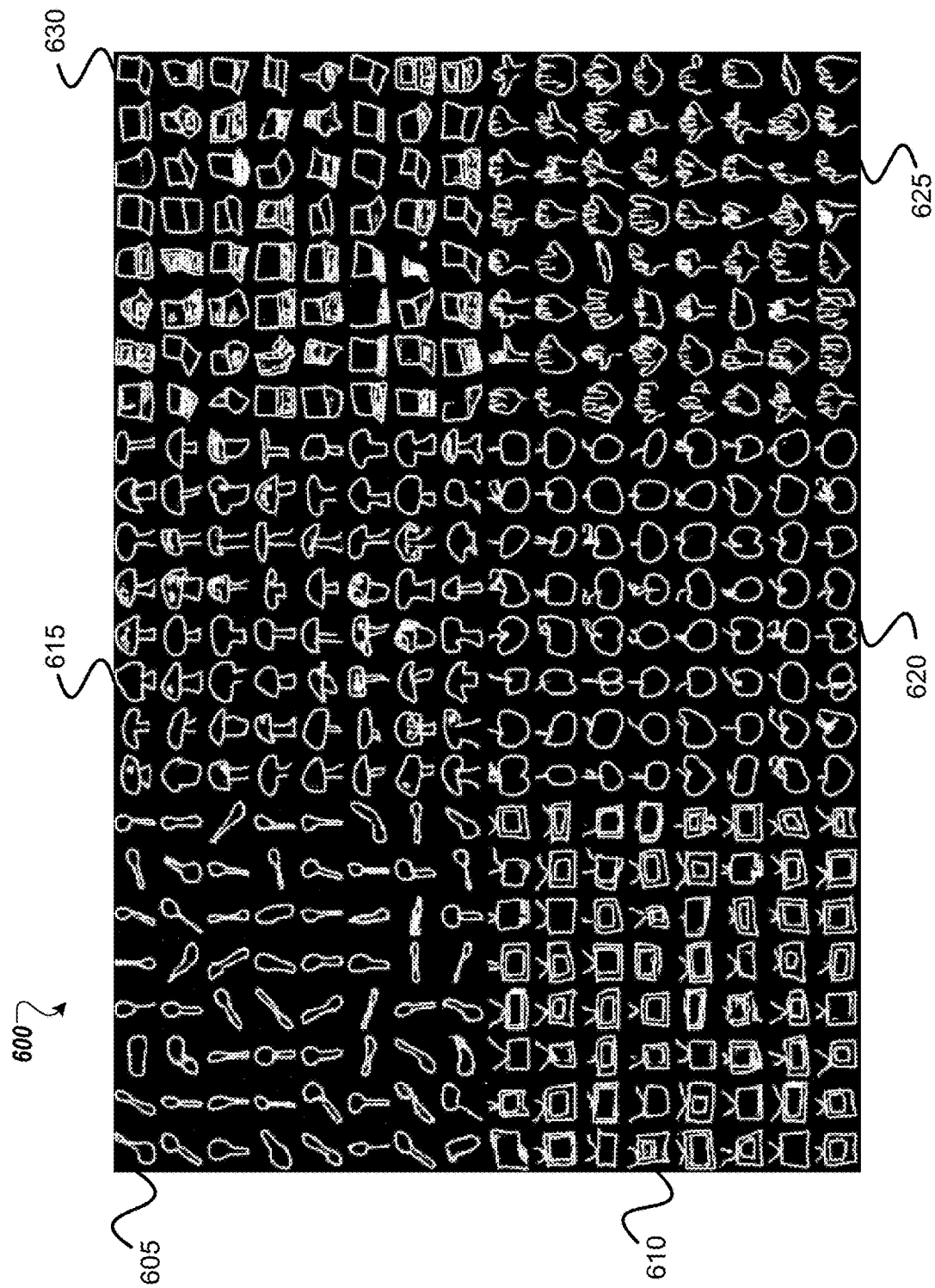
FIG. 6 illustrates a grid of generated images of example glyph types experimentally produced by an example implementation of the present application.

FIG. 6 illustrates a grid 600 of generated images of six example glyph types, (i.e., spoon 605, mushroom 615, laptop 630, TV 610, apple 620, hand 625) experimentally produced by an example implementation of the present application. To produce the grid, 22,000 28×28 training images of each glyph type were used to learn a unified model of all glyph types. The grid of the generated glyph images may exhibit considerable variation that provides users with more options. However, the generated glyph images are similar enough the style of the training data so that they may form a set of glyphs with matching style.

In some example implementations, the style may be data-driven and hence can be changed by using a different style of training data, (e.g., watercolor painting, photo realistic sketch, doodles, stick figure, etc.). Further, in some example implementations, a user's interaction with a glyph generation system (e.g., prior selections, prior modifications, prior annotations) may be feedback into the system as additional training data (e.g., "re-training" or "supplemental training") to customize a model to particular user or group of users. For example, detecting commonalities or common aspects of glyphs a user or group of uses has selected, or introduced through manual modification or annotation, may cause the system to attempt to produce additional glyphs with the detected commonalities or common aspects.

The generated images in the experimental results are visually similar to the glyph images that were drawn by humans but are machine generated by the system with only minimal user inputs.

Example Computing Environment

Figure 7:
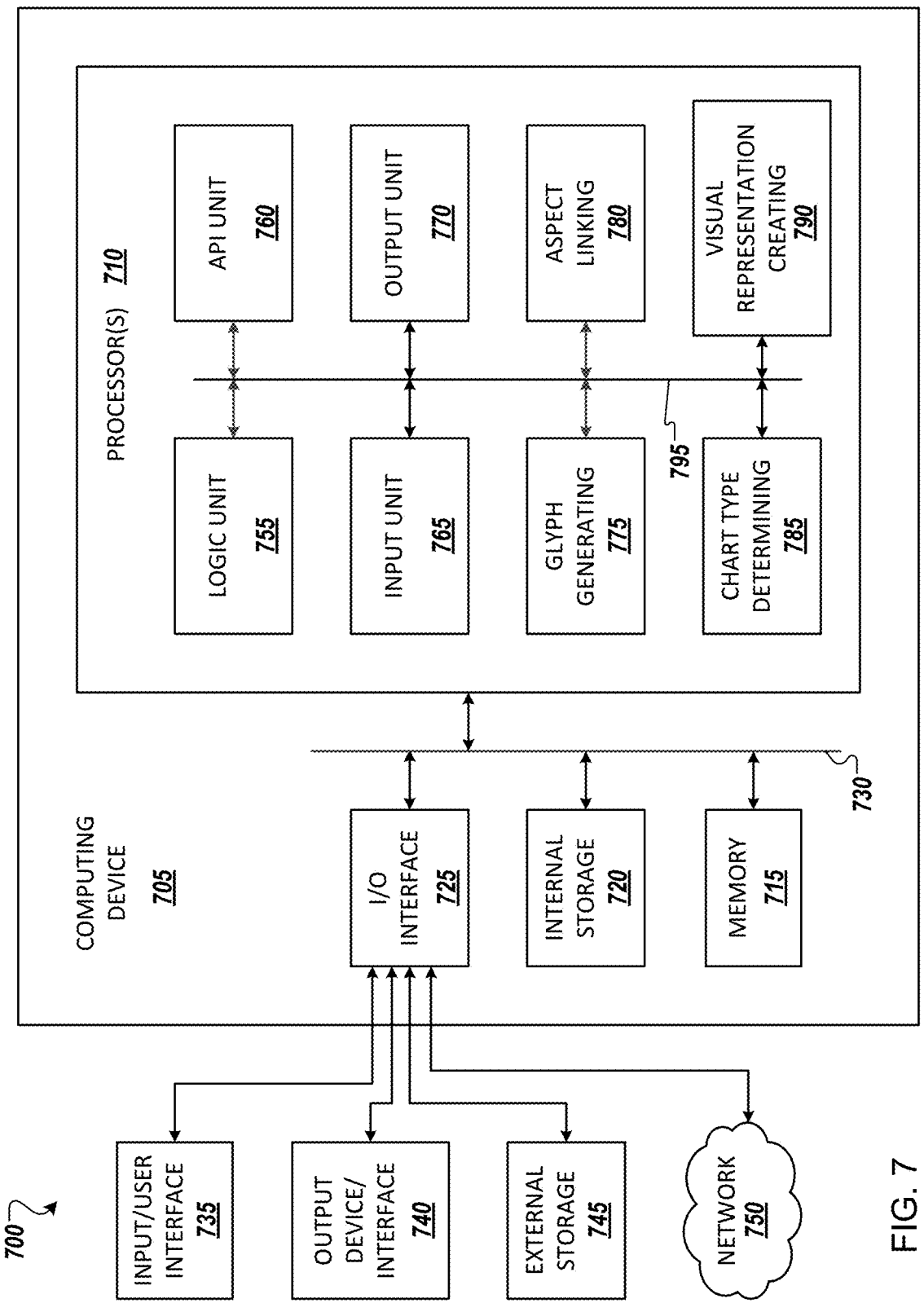
FIG. 7 illustrates an example computing environment with an example computer device suitable for use in some example implementations of the present application.

FIG. 7 illustrates an example computing environment 700 with an example computer device 705 suitable for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/interface 735 and output device/interface 740. Either one or both of input/interface 735 and output device/interface 740 can be a wired or wireless interface and can be detachable. Input/interface 735 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 740 may include a display, television, monitor, printer, speaker, braille, or the like. In some example implementations, input/interface 735 (e.g., user interface) and output device/interface 740 can be embedded with, or physically coupled to, the computing device 705. In other example implementations, other computing devices may function as, or provide the functions of, an input/interface 735 and output device/interface 740 for a computing device 705. These elements may include, but are not limited to, well-known AR hardware inputs so as to permit a user to interact with an AR environment.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 710 can execute under any operating system (OS) (not shown), in a native or virtual environment. One or more applications can be deployed that include logic unit 755, application programming interface (API) unit 760, input unit 765, output unit 770, glyph generating unit 775, aspect linking unit 780, chart type determining unit 785, visual representation creating unit 790, and inter-unit communication mechanism 795 for the different units to communicate with each other, with the OS, and with other applications (not shown).

For example, the glyph generating unit 775, aspect linking unit 780, chart type determining unit 785, and visual representation creating unit 790 may implement one or more processes shown in FIGS. 1, 2, and 4. The described units and elements can be varied in design, function, configuration, or implementation and are not limited to the descriptions provided.

In some example implementations, when information or an execution instruction is received by API unit 760, it may be communicated to one or more other units (e.g., glyph generating unit 775, aspect linking unit 780, chart type determining unit 785, and visual representation creating unit 790). For example, the glyph generating unit 775 may generate a glyph based on a received user input and provide the glyph to the aspect linking unit 780. Further, the aspect linking unit 780 may link one or more aspects of the received glyph to attributes of data to be displayed in a visual representation. Further, the chart type determining unit 785 may determine a type of chart to be displayed based on a determination based on a received user input or based on additional attributes of data to be displayed. Based on the determined chart type, the visual representation creating unit may create a chart or other visual representation based on the determined chart type and the generated glyph linked to an attribute of the data to be displayed.

In some instances, the logic unit 755 may be configured to control the information flow among the units and direct the services provided by API unit 760, input unit 765, glyph generating unit 775, aspect linking unit 780, chart type determining unit 785, and visual representation creating unit 790 in some example implementations described above. For example, the flow of one or more processes or implementations may be controlled by logic unit 755 alone or in conjunction with API unit 760.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of creating a visual representation of data, the method comprising:
   receiving a user input to be represented by a glyph;
   generating, by a neural network, the glyph based on a vector extracted based on the received user input;
   linking an aspect of the generated glyph with an attribute of the data to be visually represented; and
   displaying the visual representation of the data created using the generated glyph to represent that linked aspect of the data,
   wherein the generating the glyph comprises: detecting a type of variations in the attribute of the data to be represented and generating a plurality of glyphs based on the received user input and the detected variations of the data to be represented, the plurality of glyphs including a variation of the aspect of generated glyph, and
   wherein the linking the aspect of the generated glyph with the attribute further comprises:
   associating each of the plurality of glyphs with one of the variations in the attribute of the data to be represented.

2. The method of claim 1,
   wherein the displaying the visual representation of the data comprises: creating a chart comprising the plurality of glyphs.

3. The method of claim 2, wherein the providing the chart comprises: receiving a chart parameter from a user specifying a chart type;
   overlaying a chart having a chart type corresponding to the chart type specified by the received chart parameter over the plurality of glyphs, the chart being associated with another attribute of the data to be represented.

4. The method of claim 2, wherein the providing the chart comprises:
   determining, by the neural network, a chart parameter specifying a chart type based on detection of another type of variation in another attribute of the data;
   overlaying a chart having a chart type corresponding to the chart type specified by the determined chart parameter over the plurality of glyphs, the chart being associated with the other attribute of the data to be represented.

5. The method of claim 1, wherein the first neural network has been trained to generate potential glyphs having a high similarity to pre-existing glyphs provided in training data; and
   wherein the second neural network has been trained with pairs of glyphs and other images that have been tagged as either similar or not similar in order to generate a similarity determination model.

6. The method of claim 1, further comprising:
   providing a user interface on a display, the user interface being configured to receive the user input, the user input comprising one or more of:
   a word;
   a short description;
   a user generated sketch; and
   a user generated stroke.

7. The method of claim 6, further comprising receiving an additional user input; updating, by the neural network, the generated glyph based on the additional user input,
   wherein the additional user input comprises one or more of:

an updated user generated sketch; and an additional user generated stroke.

8. A non-transitory computer readable medium having stored therein a program for making a computer execute a method of creating a visual representation of data, the method comprising:
receiving a user input to be represented by a glyph;
generating, by a neural network, the glyph based on a vector extracted based on the received user input;
linking an aspect of the generated glyph with an attribute of the data to be visually represented; and
displaying the visual representation of the data created using the generated glyph to represent that linked aspect of the data,
wherein the generating the glyph based on the vector extracted from the received user input comprises:
combining, by a first neural network, the extracted vector with a randomly generated vector to generate a potential glyph;
comparing, by a second neural network, the generated potential glyph with one or more stored images selected based on the received user input;
selecting the potential glyph for linking to the attribute of the data based on the comparing indicating that second neural network cannot distinguish the potential glyph from the one or more selected images; and
generating another potential glyph, by the first neural network, based on the second neural network determining that the potential glyph is distinct from the one or more selected images.

9. The non-transitory computer readable medium of claim 8, wherein the generating the glyph comprises:
detecting a type of variations in the attribute of the data to be represented;
generating a plurality of glyphs based on the received user input and the detected variations of the data to be represented, the plurality of glyphs including a variation of the aspect of generated glyph; and
wherein the linking the aspect of the generated glyph with the attribute further comprises: associating each of the plurality of glyphs with one of the variations in the attribute of the data to be represented;
wherein the displaying the visual representation of the data comprises: providing a chart comprising the plurality of glyphs.

10. The non-transitory computer readable medium of claim 9, wherein the providing the chart comprises:
receiving a chart parameter from a user specifying a chart type;
overlaying a chart having a chart type corresponding to the chart type specified by the received chart parameter over the plurality of glyphs, the chart being associated with another attribute of the data to be represented.

11. The non-transitory computer readable medium of claim 9, wherein the providing the chart comprises:
determining, by the neural network, a chart parameter specifying a chart type based on detection of another type of variation in another attribute of the data;
overlaying a chart having a chart type corresponding to the chart type specified by the determined chart parameter over the plurality of glyphs, the chart being associated with the other attribute of the data to be represented.

12. The non-transitory computer readable medium of claim 8, wherein the generating the glyph based on the vector extracted from the received user input comprises:
combining, by a first neural network, the extracted vector with a randomly generated vector to generate a potential glyph;
comparing, by a second neural network, the generated potential glyph with one or more stored images selected based on the received user input;
selecting the potential glyph for linking to the attribute of the data based on the comparing indicating that second neural network cannot distinguish the potential glyph from the one or more selected images; and
generating another potential glyph, by the first neural network, based on the second neural network determining that the potential glyph is distinct from the one or more selected images.

13. The non-transitory computer readable medium of claim 12, wherein the first neural network has been trained to generate potential glyphs having a high similarity to pre-existing glyphs provided in training data; and
wherein the second neural network has been trained with pairs of glyphs and other images that have been tagged as either similar or not similar in order to generate a similarity determination model.

14. The non-transitory computer readable medium of claim 8, further comprising:
providing a user interface on a display, the user interface being configured to receive the user input, the user input comprising one or more of:
a word;
a short description;
a user generated sketch; and
a user generated stroke.

15. The non-transitory computer readable medium of claim 14, further comprising receiving an additional user input;
updating, by the neural network, the generated glyph based on the additional user input, wherein the additional user input comprises one or more of:
an updated user generated sketch; and an additional user generated stroke.

16. The non-transitory computer readable medium of claim 8, wherein the generating the glyph further comprises:
comparing, by the neural network, the generated glyph to one or more stored glyphs known to be subject to copyright protection;
selecting the potential glyph for linking to the attribute of the data based on the comparing indicating that a similarity between the generated glyph and the one or more stored glyphs known to be subject to copyright protection does not exceed a threshold; and
generating another potential glyph, by the neural network, based on the comparing indicating that the similarity between the generated glyph and the one or more stored glyphs known to be subject to copyright protection exceeds the threshold.

17. A method of generating a glyph, the method comprising:
providing a user interface on a display, the user interface being configured to receive a user input to be represented by a glyph, the user input comprising one or more of:
a word;
a short description;
a user generated sketch; and
a user generated stroke;
generating, by a neural network, a potential glyph based on a vector extracted based on the received user input;
displaying the generated potential glyph for selection, wherein the generating the glyph further comprises:
comparing, by the neural network, the generated glyph to one or more stored glyphs known to be subject to copyright protection.

18. The method of claim 17, wherein the generating the potential glyph based on the vector extracted from the received user input comprises:
combining, by a first neural network, the extracted vector with a randomly generated vector to generate the potential glyph;
comparing, by a second neural network, the generated potential glyph with one or more stored images selected based on the received user input;
selecting the potential glyph for linking to the attribute of the data based on the comparing indicating that second neural network cannot distinguish the potential glyph from the one or more selected images; and
generating another potential glyph, by the first neural network, based on the second neural network determining that the potential glyph is distinct from the one or more selected images.

19. The method of claim 17, wherein the generating the glyph further comprises:
selecting the potential glyph for linking to the attribute of the data based on the comparing indicating that a similarity between the generated glyph and the one or more stored glyphs known to be subject to copyright protection does not exceed a threshold; and
generating another potential glyph, by the neural network, based on the comparing indicating that the similarity between the generated glyph and the one or more stored glyphs known to be subject to copyright protection exceeds the threshold.

20. A method of creating a visual representation of data, the method comprising:
receiving a user input to be represented by a glyph;
generating, by a neural network, the glyph based on a vector extracted based on the received user input;
linking an aspect of the generated glyph with an attribute of the data to be visually represented; and
displaying the visual representation of the data created using the generated glyph to represent that linked aspect of the data,
wherein the generating the glyph based on the vector extracted from the received user input comprises:
combining, by a first neural network, the extracted vector with a randomly generated vector to generate a potential glyph;
comparing, by a second neural network, the generated potential glyph with one or more stored images selected based on the received user input;
selecting the potential glyph for linking to the attribute of the data based on the comparing indicating that second neural network cannot distinguish the potential glyph from the one or more selected images; and
generating another potential glyph, by the first neural network, based on the second neural network determining that the potential glyph is distinct from the one or more selected images.

21. A method of creating a visual representation of data, the method comprising:
receiving a user input to be represented by a glyph;
generating, by a neural network, the glyph based on a vector extracted based on the received user input;
linking an aspect of the generated glyph with an attribute of the data to be visually represented; and
displaying the visual representation of the data created using the generated glyph to represent that linked aspect of the data,
wherein the generating the glyph further comprises:
comparing, by the neural network, the generated glyph to one or more stored glyphs known to be subject to copyright protection.

* * * * *